United States Patent Office 3,456,045
Patented July 15, 1969

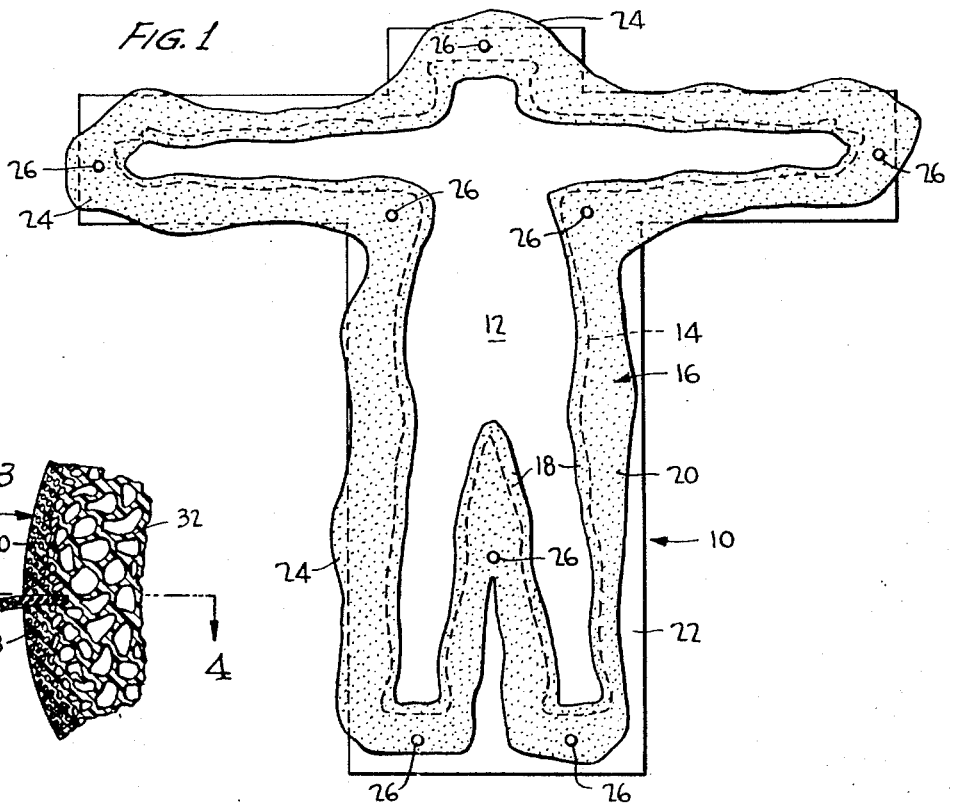

3,456,045
METHOD OF FACILITATING FLASH REMOVAL FROM FOAMED ARTICLES AND ARTICLES PRODUCED THEREBY
Jacob J. Rosen, New York, N.Y., assignor to Dublon, Incorporated, Newark, N.J., a corporation of New Jersey
Filed Oct. 31, 1967, Ser. No. 679,430
Int. Cl. B29h 7/20; B29c 1/14
U.S. Cl. 264—45                          10 Claims

ABSTRACT OF THE DISCLOSURE

Process for facilitating "flash" removal from foamed articles by engaging resilient, readily tearable, gasketing sheet material such as thin polyurethane foam between mating surfaces of mold sections in plural-section molds, with portions of the sheet material extending part way into the mold cavity. On expansion of a foamable composition within the cavity, the portions of the sheet material within the cavity are embedded in seams of the final product. The sheet material simultaneously functions to seal the juncture between mating surfaces of mold sections thereby precluding "flash" otherwise formed by the foamable material itself. Non-embedded portions of the sheet material are easily removed by tearing the same from portions embedded in the final product.

---

This invention relates to a method of facilitating flash removal from foamed articles and articles produced thereby and relates more particularly to the production of foamed articles with a preformed flash of a type which is easily tearable therefrom.

The instant inventive concepts are useful in the formation of foamed articles of any size or shape according to any conventional molding procedure wherein plural-section molds including at least two mating mold parts are utilized. Particular problems are faced in manufacturing foamed articles of rather complex shape such as dolls or doll parts and for this reason, the major portion of this specification will be directed to the formation of such articles, although it must be emphasized that this embodiment is intended to the illustrative of the broader uses of the instant inventive concepts and not limiting thereon. Thus, any desired article may be formed utilizing the instant inventive concepts and the instant invention is not limited by the particular molding technique. For example, the mold may be moved during formation of the article as in rotational casting or the like or it may be stationary. Additionally, the mold may be heated, cooled or neither heated nor cooled depending upon the processing conditions necessary with the particular article-forming material utilized therein. Especially desirable results are obtained by the production of foamed articles utilizing the methods and means disclosed in my copending application entitled, Process of Making Foamed Articles and Articles Produced Thereby, filed on an even date herewith, bearing Ser. No. 679,476 and assigned to the same assignee as the instant invention, the aforementioned copending application being a continuation-in-part of application Ser. No. 611,392 filed Jan. 24, 1967, which in turn is a continuation-in-part of application Ser. No. 422,124 filed Dec. 30, 1964. The disclosures of all three of these applications are incorporated herein by reference and will be discussed in further detail hereinafter.

In presently known methods employed in the manufacture of dolls and similar articles, the molds commonly utilized comprise a plurality of mold sections each having internal article-forming surfaces terminating in peripheral edges defined by the mating surfaces of the individual sections. When the parts are assembled, the article-forming surfaces together define an internal mold cavity and the final product includes seams formed by by the junctures of the mating surfaces of the mold sections. When article-forming material is introduced into the mold cavity and the molding operation is effected in any conventional manner, the article-forming material is distributed throughout the mold cavity into contact with the article-forming surfaces. During such operation, article-forming material flows or is pressed into the space between the mating surfaces of adjacent mold sections and is solidified therein, resulting in the formation of an undesirable "flash" on the article thus produced. When this "flash" is removed the seams mentioned hereinabove remain on the final product.

The production of "flash" theoretically should not occur if the mold sections were prefectly sealed. However, constant use of the molds, particularly in certain processes wherein they are subjected to heating and cooling, causes warping of the mold sections resulting in an imperfect seal between the mating surfaces of the mold sections whereby leakage of the article-forming material can occur.

Many complex procedures have been suggested heretofore for removing "flash" but each of these techniques presents a number of disadvantages. For example, the need for various "flash"-removing equipment with its initial cost, maintenance and space requirements constitutes but one of such disadvantages. The time element and additional labor costs are another obvious objection. Additionally, complex articles such as dolls provide particular problems in "flash" removal in that certain areas of the product, such as under the arms and in the crotch, are relatively confined and therefore difficult to get to. Moreover, the material utilized in the production of the article, particularly in accordance with the teachings of the aforementioned copending applications which form foamed articles from vinyl plastisols, is extremely strong and tear-resistant making "flash" removal even more difficult.

Theoretically, the production of "flash" could be avoided by gasketing the mating mold surfaces, but for optimum results gasketing material would have to be utilized which was not penetratable by the article-forming material. Further, gaskets would have to be provided which terminated exactly at the peripheral edges of the article-defining surfaces so as to produce a configuration within the mold of the desired shape. Such gasketing materials, in and of themselves, would be relatively expensive, and further, it will be obvious that after some use of the mold, defects in the gasket would soon result necessitating frequent replacement. Therefore, from a practical standpoint, the use of gaskets in a normal manner, leaves much to be desired.

It is therefore a primary object of the instant invention to provide a method of facilitating "flash" removal from foamed articles wherein the articles are formed in a plural-section mold. Although, in the production of many articles, the formation of "flash" at all of the seams causes significant difficulties, in certain instances "flash" over only a portion of the article is a problem. For example, in some articles, a portion of the final product is hidden in use whereby the presence of "flash" at such portions is inconsequential and removal of the same is not necessary. Additionally, in certain articles removal of "flash" over most of the seams causes little or no difficulty because such portions of the seams are readily accessible whereas other portions of the seams are quite confined making "flash" removal quite difficult and time consuming. Thus, although the instant inventive concepts are primarily directed to facilitating "flash" removal from all of the seams of a foamed article produced in a multi-section mold, it should be understood that the broadest concepts hereof are applicable to facilitating "flash" removal from only a portion of the seams of a foamed article.

Considering the foregoing, the instant invention has as a primary object the production of foamed articles from which "flash" can be readily removed and the articles so produced, with the techniques and materials utilized according thereto being simple and inexpensive whereby commercial application of the concepts hereof is highly desireable.

In effect, the basic concepts hereof appear to be directly contrary to prior art techniques for overcoming the problems of "flash" removal in the production of articles of the type described herein. Ordinarily, prior art procedures have been directed to minimizing the production of "flash." The instant invention, on the other hand, is designed to produce a "flash" on the final product, but minimizes the difficulties encountered heretofore in "flash" removal by substituting a readily tearable "flash" material for the integral "flash" ordinarily formed in the production of a foamed article. Additionally, while utilizing a gasketing technique, the instant invention avoids the necessity of relatively expensive gasketing material and extremely careful and at least substantially permanent securement of such gasketing material to the mating surfaces of the mold elements. According to the instant inventive concepts the gasketing material utilized is extremely inexpensive and the positioning of the same in relation to the mold elements requires very little care. In fact, according to the procedures hereof, the gasketing material functions simultaneously to seal the mating surfaces of the mold elements while providing the final product with a "flash" which is readily tearable therefrom, this "flash" being embedded in the final product by permitting portions of the gasketing material to extend part way into the mold cavity thereby precluding the necessity for careful positioning of the same.

According to the basic concepts hereof, the gasketing material which is partly embedded in a portion or all of the seams of the final product, is removed by tearing the non-embedded portions from the embedded portions. However, for some applications it may be desirable to permit part of the gasketing material to remain on the final product for use as an integral portion of the final product or for subsequent removal, as desired, by the ultimate purchaser. For example, in the manufacture of a doll according to the instant inventive concepts, it is possible to provide the doll with a light, filmy "cape" formed of the gasketing material and embedded in at least a portion of the seams of the doll. This "cape" can remain with the doll when it is sold and the ultimate purchaser may readily remove the same, if desired, by tearing the non-embedded portions of the "cape" from the embedded portions thereof. It should be emphasized, however, that the primary objects of this invention are directed toward facilitating "flash" removal and while there may be some unusual circumstances in which a manufacturer would desire to leave a portion or all of the gasketing material attached to the final product, in the normal instance the entire non-embedded portions of the gasketing material would be torn from the article prior to sale.

Other and further objects hereof reside in the combination of elements, arrangement of parts and features of construction of the products hereof as well as the manipulative steps and materials utilized in the techniques set forth hereinafter.

Still other objects will in part be obvious and in part be pointed out as the description of the invention proceeds and as shown in the accompanying drawing wherein:

FIGURE 1 is an elevational view of one mold section utilized in the formation of a doll body with a sheet of gasketing material according to the instant invention being positioned on the mating surfaces thereof prior to assembly of the mold sections and manufacture of the final product;

FIGURE 2 is an elevational view of a foamed doll body formed according to the instant inventive concepts with the gasketing material attached thereto, a portion of the gasketing material being shown as torn from the doll body for illustrative purposes;

FIGURE 3 is an enlarged fragmentary cross-sectional view through a portion of the doll body and attached gasketing material taken substantially on lines 3—3 of FIGURE 2; and FIGURE 4 is a gragmentary cross-sectional view taken substantially on lines 4—4 of FIGURE 3, partly in elevation and partly broken away for illustrative clarity.

Like reference characters refer to like parts throughout the several views of the drawing.

As indicated hereinabove, any conventional molding techniques and any conventional foamable material may be utilized in the manufacture of foamed articles according to the instant inventive concepts. Ordinarily, a given quantity of the foamable material is placed in the portion of the mold cavity defined by one of the mold sections, the volume of such quantity of foamable material being less than the volume of the mold cavity. The mold sections are then assembled to define the cavity and the foamable material is expanded in any conventional manner, ordinarily by the application of heat to decompose a blowing agent dispersed throughout the foamable material, whereby the foamable material fills, or at least substantially fills, the cavity and contacts the article-defining surfaces thereof to produce a desired final configuration. Various well-known, foamable materials including foam rubber and foamable plastic materials have been processed in the manner defined hereinabove and the details of such materials and techniques are not important to the instant inventive concepts.

However, highly desirable methods for the formation of foamed articles have been set forth in detail in the aforementioned copending applications and reference is made to such applications for a full discussion of the preferred procedures and materials to be utilized with the instant invention. Basically, the methods set forth in the aforementioned applications include introducing a predetermined amount of an unfoamed, but foamable, plastic composition, particularly foamable polyvinyl chloride plastisol, into a mold cavity, the amount of the foamable composition being less by volume than the volume of the cavity. After assembly of the mold elements, the cavity with the foamable composition therein is moved, preferably as in conventional rotational casting, to initially distribute the plastic compositoin throughout the cavity while heating the same to gel a layer of the plastic composition on the walls of the cavity. The gelled layer is then foamed, again preferably by the application of heat, to expand the gelled layer to fill, or at least substantially fill, the cavity while communicating the cavity through relatively small passageway means with an environment under less pressure than that existent within the cavity. During this foaming operation the cavity is maintained closed except for communication therewith through the aforementioned, relatively small passageway means. This technique produces a final product which has an integral, substantially completely enveloping, relatively smooth skin with a closed-cellular internal structure extending substantially continuously therewithin. In view of the highly desirable nature of the final product produced by such procedures, it is preferable to utilize the same as the basic method for manufacturing foamed articles, modified in accordance with the instant invention. However, the broader concepts hereof are not to be limited to this preferred embodiment.

Referring now to the drawing, and more particularly to FIGURE 1, one section of a plural-section mold is designated generally by the reference numeral 10. In the embodiment shown in the drawing, the mold section 10 defines a portion of a doll-shaped mold cavity designated generally by the reference numeral 12, the peripheral edges of the article-defining surfaces being shown by dotted lines 14 as hidden by a thin sheet of resilient, readily tearable, gasketing material designated generally by the reference numeral 16, portions 18 of which overlap the peripheral edges 14 and extend part way into the mold cavity 12, portions or all of the remainder 20 of the gasketing material 16 resting on the mating surfaces 22 of the mold element 10. The gasketing sheet material 16 has been purposely shown as irregular to emphasize the fact that the portions 18 thereof which overlap the peripheral edges 14 of the article-defining surfaces need not be uniform throughout, and to further emphasize the fact that the mating surfaces 22 need not be completely covered by the gasketing material 16 and, in fact, portions of the gasketing material 16 can even extend beyond the mating surfaces 22 outside of the mold element 10 as shown at 24. This merely illustrates that positioning of the gasketing material 16 does not require great care. If desired, pegs 26 or the like may be utilized to facilitate positioning the gasketing material 16 on the mating surfaces 22 of the mold element 10.

Of course, an additional mold element (not shown) would be utilized in conjunction with the mold element 10 and would have article-defining surfaces which complement the article-defining surfaces in the mold element 10 to complete the mold cavity. Such additional mold element would have mating surfaces which cooperate with the mating surfaces 22 and the two mold elements would be assembled in any desired manner and secured together with any conventional means after a quantity of foamable material had been introduced into the portion of the mold cavity 12 defined in the mold element 10 and after the gasketing material 16 had been positioned in the manner shown in FIGURE 1. In this manner, the portions 20 of the gasketing material 16 would be engaged by the cooperating mating surfaces of the two mold elements with the portions 18 thereof extending part way into the mold cavity.

During the subsequent foaming operation, the gasketing material 16 would function to seal the juncture between the mating surfaces of the cooperating mold elements thereby precluding the formation of any "flash" from the foamable material itself. However, as the foamable material is expanded to form the foamed article, shown as the doll body 28 in FIGURE 2, the portions 18 of the gasketing material 16 are embedded within the seams of the doll body in the manner shown particularly in FIGURES 3 and 4 to form what may be considered an intermediate product as shown in FIGURE 2. Due to the "readily tearable" nature of the gasketing material 16, the non-embedded portions thereof may be partially or completely severed from the embedded portions 18 thereof manually or in any other desired manner. Initial removal of the non-embedded portions of the gasketing material 16 is illustratively shown at 16′ in FIGURE 2.

Use of a foamable vinyl plastisol composition with the combined "moving" and "venting" techniques disclosed in the aforementioned copending applications results in a final product including a substantially continuously enveloping, generally smooth, outer skin portion designated generally by the reference numeral 30 in FIGURES 3 and 4, with a cellular structure 32 integral with the skin 30 and extending continuously, or at least substantially continuously, within the confines of the skin. The portions 18 of the gasketing material 16 are securely bonded within the seams of the foamed article and will not be pulled therefrom when the non-embedded portions are torn loose to remove a portion, or all, of the "flash" formed by the gasketing material 16.

As indicated previously, the gasketing material 16 should be relatively thin, for example, less than approximately ⅛ inch to facilitate its being torn. Further, such material should be resilient in order that it can function to effectively seal the mating surfaces of the cooperating mold elements. While various materials having these desired properties can be utilized, a thin sheet, approximately 40 mils, for example, of a foamed polyurethane-based material such as ordinary polyurethane or any modified polyurethane are particularly desirable in that they have an intercommunicating or "open" cellular structure which permits the foamable material being molded to penetrate the cells thereof providing an even better bond between the foamed material of the final product and the embedded portions 18 of the gasketing material. Foamed polyurethane-based materials are quite compatible with foamed polyvinyl chloride materials of the type preferably utilized in the manufacture of foamed articles according to the instant inventive concepts, and can be provided in colors substantially identical to the colors of the foamable plastisols so that the embedded portions in the seams of the final product are hardly noticeable.

What is claimed is:

1. In a process of manufacturing foamed articles in a cavity defined interiorly of a plural-section mold, wherein a quantity of a foamable material smaller in volume than said cavity is placed in the portion of said cavity defined by one of said mold sections, said mold sections are assembled to define said cavity, and said foamable material is expanded to at least substantially fill said cavity and form a foamed article having seams corresponding to the junctures defined by the mating surfaces between said mold sections, the improvement which comprises removably positioning a resilient, readily tearable, gasketing sheet material on at least a portion of the mating surfaces of at least one of said mold sections prior to assembly of said mold sections with portions of said sheet material extending part way into said cavity, during assembly of said mold sections to define said cavity, engaging further portions of said sheet material between mating surfaces of said mold sections to seal the junctures defined by the portions of said mating surfaces engaging said sheet material, expanding said foamable material to at least substantially fill said cavity thereby embedding said portions of said sheet material extending part way into said cavity in the portions of said seams of said foamed article juxtaposed to the junctures defined by said portions of said mating surfaces of said mold sections engaging said sheet material, removing said foamed article carrying said sheet material from said mold, and tearing at least part of the non-embedded portions of said sheet material from the embedded portions thereof.

2. The process of claim 1 wherein portions of said sheet material are engaged between all mating surfaces of said mold sections to thereby seal all of said junctures defined by said mating surfaces and form a foamed article having portions of said sheet material embedded in all of said seams on expansion of said foamable material.

3. The process of claim 1 wherein said sheet material is an open-cellular foamed sheet material whereby portions of said foamable material penetrate the open cells of said sheet material on expansion of said foamable material to securely bind said foamable material to the embedded portions of said sheet material in said foamed article.

4. The process of claim 1 wherein said sheet material is approximately 40 mils in thickness.

5. The process of claim 1 wherein said foamable material is a foamable vinyl plastisol.

6. The process of claim 1 wherein said sheet material is a foamed polyurethane.

7. The process of claim 1 wherein said sheet material is a foamed polyurethane and is less than approximately ⅛ inch in thickness, and said foamable material is a foamable vinyl plastisol.

8. In a process of manufacturing foamed articles in a cavity defined interiorly of a plural-section mold, wherein a quantity of a foamable vinyl plastisol smaller in volume than said cavity is placed in the portion of said cavity defined by one of said mold sections, said mold sections are assembled to define said cavity, said cavity is moved with said plastisol therein to initially distribute said plastisol throughout said cavity, said plastisol is gelled on the walls of said cavity while said cavity is moved, and said plastisol is then foamed to at least substantially fill said cavity while communicating said cavity through relatively small passageway means with an environment under less pressure than that existent within said cavity while maintaining said mold closed except for communication therewith through said passageway means during the foaming of said plastisol, thereby forming a foamed article having seams corresponding to the junctures defined by the mating surfaces between said mold sections, the improvement which comprises removably positioning a resilient, readily tearable, gasketing sheet material on at least a portion of the mating surfaces of at least one of said mold sections prior to assembly of said mold sections with portions of said sheet material extending part way into said cavity, during assembly of said mold sections to define said cavity, engaging further portions of said sheet material between mating surfaces of said mold sections to seal the junctures defined by the portions of said mating surfaces engaging said sheet material, expanding said plastisol to at least substantially fill said cavity thereby embedding said portions of said sheet material extending part way into said cavity in the portions of said seams of said foamed article juxtaposed to the junctures defined by said portions of said mating surfaces of said mold sections engaging said sheet material, removing said foamed article carrying said sheet material from said mold, and tearing at least part of the non-embedded portions of said sheet material from the embedded portions thereof.

9. The process of claim 8 wherein said sheet material is an open-cellular foamed sheet material having a thickness of less than approximately ⅛ inch, wherein portions of said sheet material are engaged between all mating surfaces of said mold sections to thereby seal all of said junctures defined by said mating surfaces and form a foamed article having portions of said sheet material embedded in all of said seams on expansion of said plastisol, whereby portions of said plastisol penetrate the open cells of said sheet material on expansion of said plastisol to securely bind said plastisol to the embedded portions of said sheet material in said foamed article.

10. The process of claim 8 wherein said cavity defines at least a portion of a doll.

References Cited

UNITED STATES PATENTS

| 2,352,083 | 6/1944 | Detjen | 249—55 XR |
| 2,582,922 | 1/1952 | Crowley et al. | |
| 2,839,788 | 6/1958 | Dembiak | 264—310 XR |
| 2,936,494 | 5/1960 | Johnson. | |
| 2,976,573 | 3/1961 | Davis. | |
| 3,036,342 | 5/1962 | Fino | 264—45 |
| 3,273,205 | 9/1966 | Hanley. | |

FOREIGN PATENTS 1,377,917   9/1964   France.

OTHER REFERENCES

Cram, D. J., "The Free Expansion of PVC Using Azodicarbonamide." In British plastics. January 1961, pp. 24–29(G).

Jones, D. R. "PVC Foaming With Sodium Borohydride." In British plastics, May 1962 pp. 248–250.

PHILIP E. ANDERSON, Primary Examiner

U.S. Cl. X.R.

18—5, 26, 39; 46—156; 249—55; 264—48, 51, 310